United States Patent

Crosno

[15] 3,662,099

[45] May 9, 1972

[54] SERVO SYSTEM FOR VIDEO RECORDER

[72] Inventor: Philip M. Crosno, Cupertino, Calif.

[73] Assignee: Cartridge Television, Inc., San Jose, Calif.

[22] Filed: June 26, 1970

[21] Appl. No.: 50,061

[52] U.S. Cl. .....................178/6.6 P, 178/6.6 A, 179/100.2 T

[51] Int. Cl. .......................................H04n 5/78, G11b 21/10

[58] Field of Search ...............178/6.6 A, 6.6 P; 179/100.2 B, 179/100.2 T

[56] References Cited

UNITED STATES PATENTS 3,012,106 5/1961 Brenner et al. .....................178/6.6 A

*Primary Examiner*—Stanley M. Urynowicz, Jr.

*Assistant Examiner*—Steven B. Pokotilow

*Attorney*—Charles M. Hogan, Irwin P. Garfinkle and Townsend & Townsend

[57] ABSTRACT

A video recorder has multiple rotating heads, the speed and phase of rotation of which must be accurately synchronized with the transmitted video signal or with a prerecorded control signal. This is accomplished by means of a servo which utilizes two fixedly positioned pick-up devices adjacent the rotating heads for detecting the passing of certain fixed points on a disk carrying the heads. The period of time for a point to pass between two detectors is compared with the reference to control the speed of the driving motor. The phase of the driving motor is controlled by developing a positional error signal as a result of any difference in time between the detection of a given point on the disk with the occurrence of either the video sync or a prerecorded control signal. Means are also provided for assuring the proper sequence of operation of the heads.

10 Claims, 4 Drawing Figures

INVENTOR.
PHILIP M. CROSNO
BY Charles M. Hogan
Edwin P. Canfield
ATTORNEYS

INVENTOR.
PHILIP M. CROSNO

BY

ATTORNEYS.

INVENTOR.
PHILIP M. CROSNO
BY
ATTORNEYS.

SERVO SYSTEM FOR VIDEO RECORDER

BACKGROUND OF THE INVENTION

The present invention relates to a servo system useful in "-skip field" video recording systems for recording and playing back television video signals on a magnetic tape. A typical skip field system is disclosed in U.S. Pat. No. 3,359,365 entitled "Recording and Reproducing System" issued to Kihara on Dec. 19, 1967. This prior art system records only every second or third field or frame of the video signal, but on playback reproduces each field two or three times to obtain a series of signals equal in number to the series of signals originally present.

The prior art systems of the skip field type require a rotating disk or drum on which a plurality of magnetic heads are angularly spaced and on which the tape travels in a helical path. These systems record on a magnetic tape only specified fields of a continuous train of fields in the form of skewed magnetic tracks, but during playback the signals on each of the tracks are reproduced a plurality of times. For example, in the embodiment of the invention illustrated herein, only one field out of every three is recorded, but during reproduction each of the tracks corresponding to a field is reproduced three times to obtain a series equal in number to the series originally present.

As is well known in the art, a composite video signal contains a vertical sync. The present invention provides a servo system which utilizes the vertical sync signal to control the operation of the motor drive for the magnetic heads so that the rotation of the magnetic heads can be synchronized velocity-wise and positionally.

SUMMARY OF THE INVENTION

A skip field video recording and reproducing system has three magnetic heads positioned on a rotating disk. Only one of the heads records the composite video signal on a magnetic tape which is traveling in a helical path with respect to the heads on the disk, so that composite video signals, including the video sync, are recorded on the tape in skewed tracks. All three heads are used for playback, each of the heads being accurately positioned with respect to the recorded vertical sync so that the video images are synchronized.

The invention includes a two-loop servo for controlling the velocity and position of the magnetic heads relative to the vertical sync signal. The first loop is a velocity loop which establishes a predetermined motor speed. The second loop is a position loop which adjusts the phase of the motor so as to make the position of the heads coincident with the position of the vertical sync.

In the illustrated embodiment of the invention the three heads are carried on an opaque rotating disk which is provided with three correspondingly positioned light-transmitting holes spaced 120°. The servo also includes two stationary light-sensitive pick-up devices spaced 60° apart at the periphery of the disk. The time that it takes for each hole to pass from the first pick-up device to the second pick-up device is measured and compared with a reference. Any deviation from the reference results in a velocity error signal. For developing an error signal in the position loop, the time at which each vertical sync pulse occurs is compared with the time at which the second pick-up device is passed by a hole. Any difference in time yields a position error. Both of these errors are used for correcting the velocity and the phase of the head driving motor so that the position of the tape is synchronized with the vertical sync. In addition, means are incorporated for establishing a predetermined order of operation for the heads.

The object of the invention is to provide a servo system for rotating a disk at a given constant velocity and to synchronize disk rotation positionally with the vertical sync of a composite video signal.

THE DRAWINGS

DESCRIPTION OF THE DISCLOSED EMBODIMENT

Figure 1:
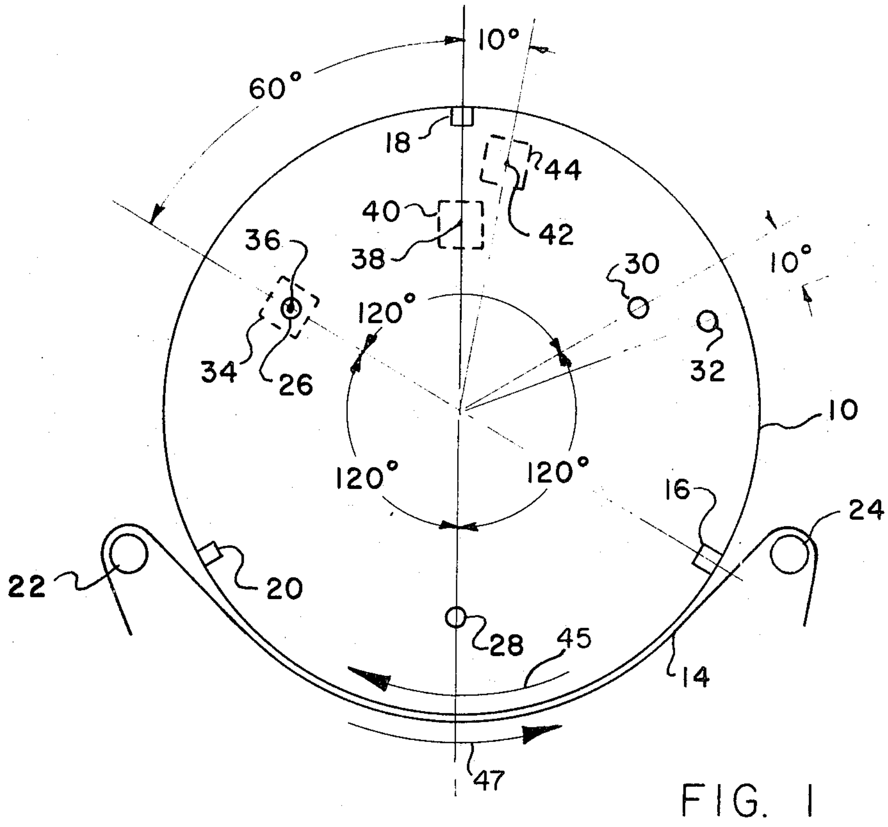
FIG. 1 is a schematic representation of the mechanical arrangement of the disk, magnetic heads and detecting devices used in accordance with this invention.
Figure 2:
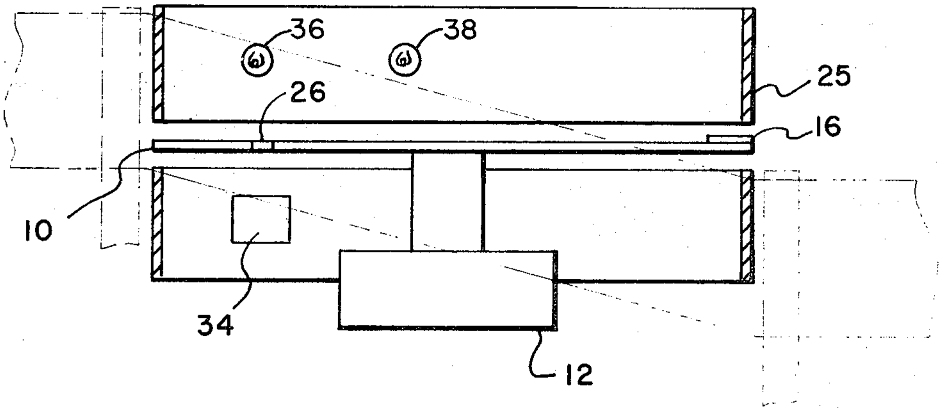
FIG. 2 is a cross-sectional view taken through the line 2—2.

Referring to FIGS. 1 and 2, the servo system includes a disk 10 driven by a motor 12. The object of the disclosed system is to control the speed and phase of the motor 12 with respect to the video signal, i.e., during record mode the disk is synchronized with the transmitted vertical sync signal, so that a control signal can be properly positioned on a tape 14 along with the video information, and during the playback the disk is synchronized with a recorded control signal.

As seen in FIG. 1, three magnetic recorder/reproducer heads 16, 18 and 20, spaced 120° apart, are carried by the rotating disk 10. The magnetic tape 14 is maintained by means of tape guides 22 and 24 and by a "clam shell" type stationary drum 25 in the arcuate path of the magnetic heads and helically disposed with respect to the disk 10 so that skewed magnetic tracks are applied to the tape in the manner taught in the Kihara patent. Moreover, as taught by Kihara, the heads are axially spaced so that each head scans the same recorded track, provided the speed of the head relative to the tape is properly established and maintained.

The disk 10 is opaque but is provided with three light-transmitting holes 26, 28 and 30 diametrically aligned with the heads 16, 18 and 20, respectively. In addition, the disk is provided with an additional light-transmitting hole 32 spaced approximately 10° from the hole 30 and positioned radially outward therefrom. Each of the holes 26, 28 and 30 are positioned equal distances from the axis of rotation of the disk.

Several light-sensitive pick-up devices are fixedly positioned with respect to the rotating disk. A head switching pick-up device 34 is located at a position established by the point at which the head 16 enters the tape, i.e., the point on the tape at which it is desired that recording at head 16 begins. A second light-sensitive position pick-up device 40 is angularly spaced 60° from the switching pick-up device. Except when one of the holes 26, 28 or 30 is opposite the head switching pick-up device 34, the light from a stationary light source, diagrammatically shown as a stationary point 36, is blocked from it by the disk. Similarly, except when the holes 26, 28 and 30 are opposite a stationary light source 38, the light from the source 38 is blocked by the position pick-up device 40. The light sources 36 and 38 are positioned so that the light therefrom can be transmitted only to the pick-up devices 34 and 40 through one of the holes 26, 28 and 30 when in a corresponding light-transmitting position.

A third stationary light source 42 is positioned opposite a "once around" pick-up device 44. The once-around pick-up device 44 is positioned with respect to the hole 32 so that light from the source 42 is transmitted therethrough only when the hole 32 is angularly aligned with the pick-up device 44. This occurs only once during each revolution of the disk.

While the pick-up devices have been described as light sensitive, and while the illustrated embodiment schematically provides stationary light sources in conjunction with a rotating disk having precisely positioned light-transmitting holes, it should be understood that this arrangement is described by way of example only and that other types of pick-up devices may be used. For example, the invention contemplates the use of magnetic pick-up devices to be used in conjunction with magnets. In some circumstances combinations of various pick-up devices may prove to be preferable.

Figure 4:
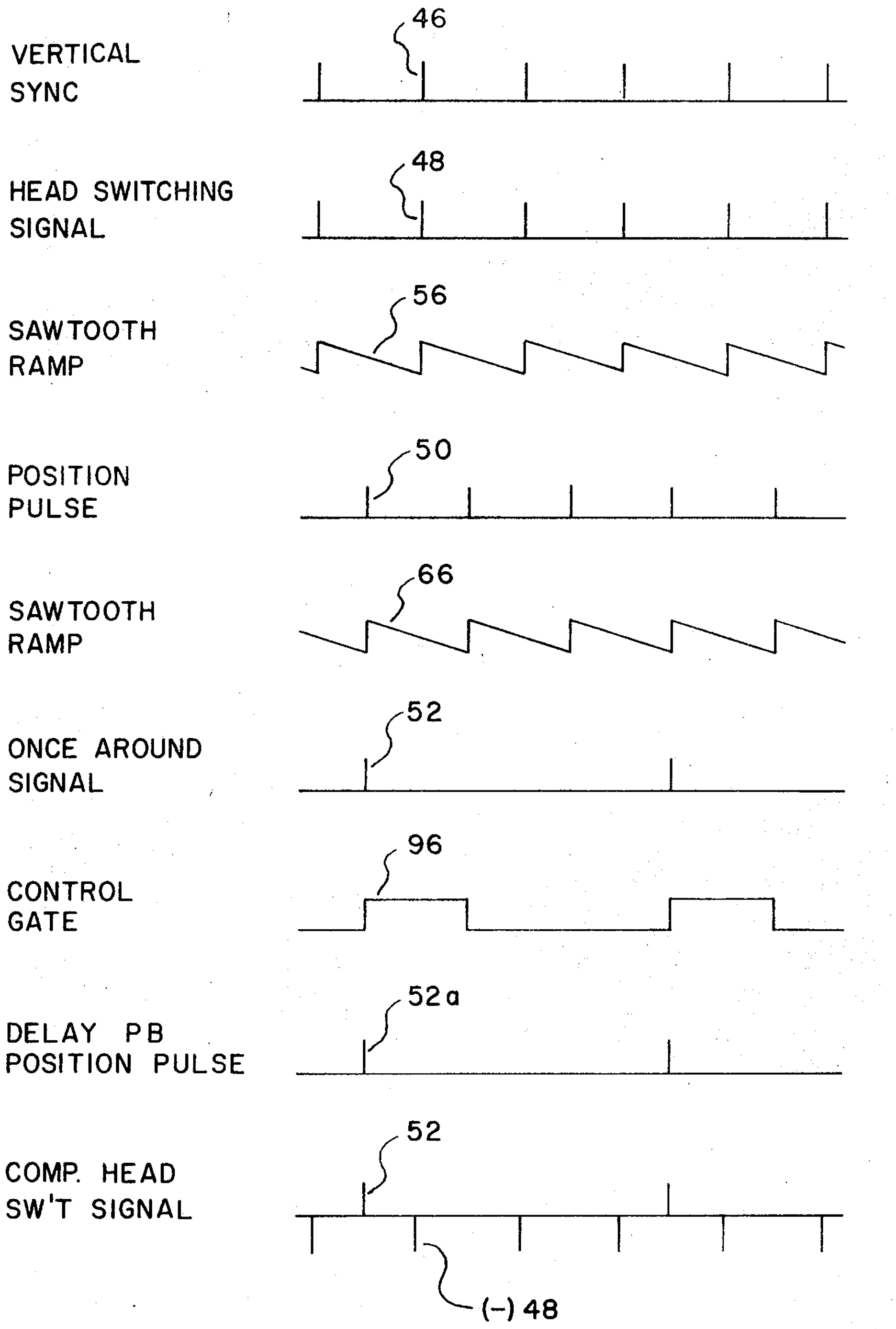
FIG. 4 shows a series of curves illustrating the operation of this invention.

As the disk 10 is rotated in the direction of the arrow 45 and head 16 enters the tape (which is moving in the direction of arrow 47) to the position shown in FIG. 1, the head switching pick-up device 34 generates a head switching pulse 48 (see FIG. 4) as a result of the light from the source 36 passing through the hole 26. Similarly, as the head 18 enters the tape, a second pulse 48 is developed and when the head 20 enters the tape, the pick-up device 34 generates a third pulse 48. Each time a pulse 48 is generated, one of the magnetic heads 16, 18 or 20 is switched into operation, by means of a logic circuit to be described below.

The position pulses 50 are always 60° displaced from the pulses 48. Since the position pick-up device 40 is located 60° from the head switching pick-up device 34, and each time one of the holes 26, 28 or 30 passes this device, position pulse 50 is generated.

The vertical sync is shown as a series of pulses 46. These pulses are in the video transmission. The head-switching pulses 48 generated by the head switching pick-up device 34 are shown in synchronism with (or in some cases can be positioned slightly ahead of) the vertical sync signals 46. This, of course, is the desired end result and may not necessarily be the case when starting the system into operation.

Each time the hole 32 passes the once-around pick-up device 44, a once-around signal pulse 52 is generated by the pick-up device 44. The pick-up device 44 and the hole 32 are so related that there is a slight delay between the pulse 52 and the pulse 50 generated as a result of the hole 28 passing the pick-up device 40. This is accomplished in the illustrated arrangement by spacing the hole 32 approximately 10° ahead of the hole 30, while the pick-up device 44 is spaced slightly more than 10° ahead of pick-up device 40.

Figure 3:
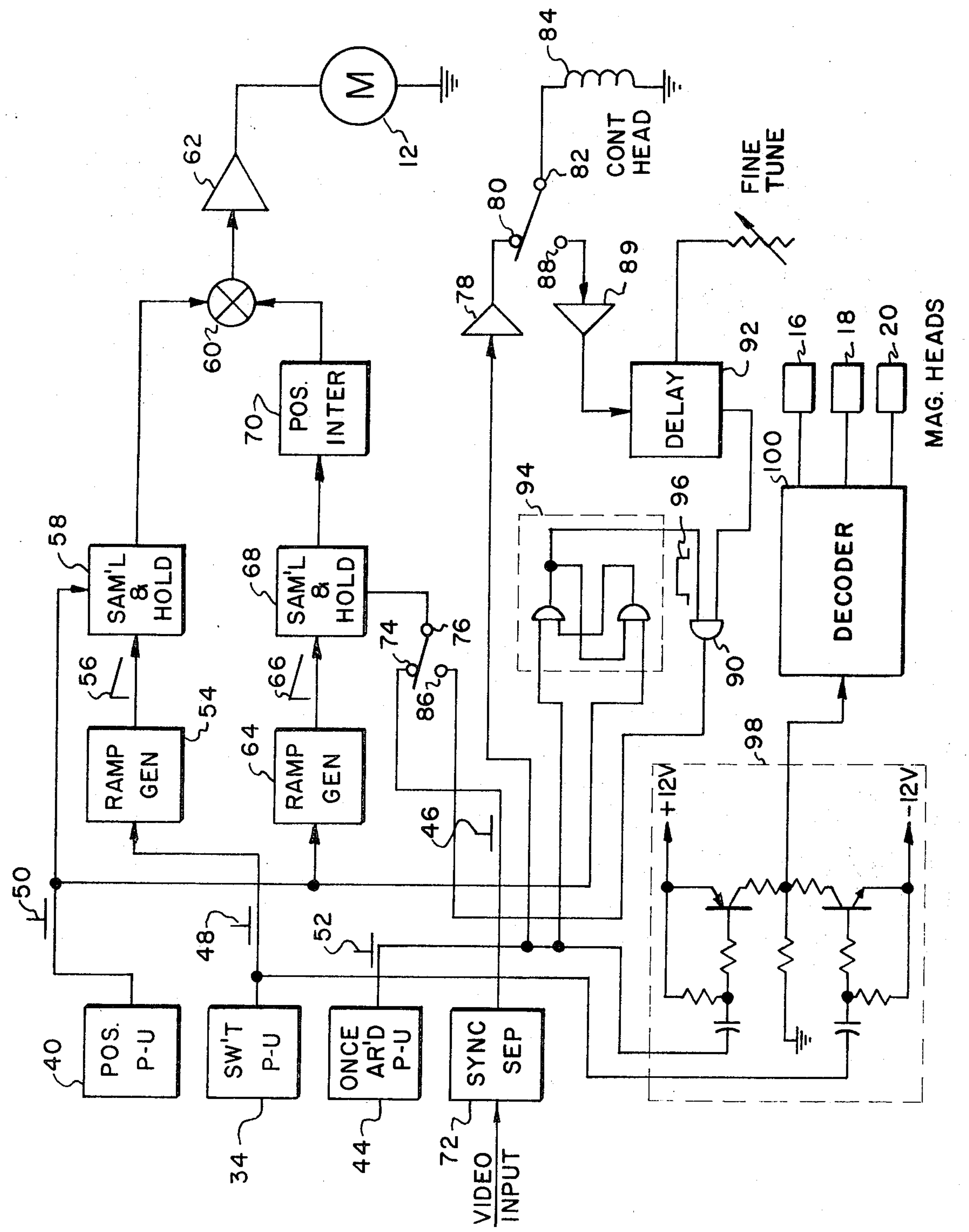
FIG. 3 is a schematic representation in block diagram form of the electronic circuitry utilized in accordance with this invention.

Refer now to FIG. 3. The servo system includes two similar servo loops, a velocity loop and a position loop. The switching pulses 48 from the pick-up device 34 are applied to a ramp generator 54 which serves to generate a sawtooth ramp 56. The sawtooth ramp 56 begins at some positive voltage and reduces to a negative voltage level at a rate dependent on pre-established time constants. These time constants are such that the sawtooth should be at ground potential when the hole 20 travels the 60° to the position pick-up device 40. When the position pick-up device 40 generates a pulse 50, the sawtooth 56 is sampled and held in a sample and hold circuit 58. Any voltage output from the sample and hold circuit 58 represents velocity error. This velocity error is applied to a summer 60 and then to an amplifier 62 in the control circuit of the motor 12.

Thus, the velocity loop consists of three measured time intervals for every revolution of the disk. This arrangement in conjunction with the placement of the pick-up devices results in velocity detection with no so-called "tooth to tooth" error. This result is achieved because the time it takes the disk to travel the same fixed distance, i.e., from pick-up device 34 to pick-up device 40, is measured for each hole. That is to say, one point on the disk (one of the holes 20, 28 or 30) causes the sawtooth ramp 56 to start and also results in a sample at a later time.

The output from the position pick-up device 40 is also applied to a second sawtooth ramp generator 64 in the position servo loop. Since the pick-up devices 34 and 40 are spaced 60°, the sawtooth output 66 of the ramp generator 64 starts 60° later. The sawtooth ramp 64 takes the same form as the sawtooth ramp 56 and is sampled and held in a sample and hold circuit 68. Any output from the sample and hold circuit 68 represents position error which is applied to an integrator 70, the output of which is applied to the summer 60 and then to the amplifier 62 in the control circuit of the motor 12.

In the record mode, the time of sampling of the sawtooth ramp 66 is determined by the occurrence of the vertical sync pulse 46 derived from a conventional sync separator 72. The pulse 46 is applied through the contact 74 of a record/playback switch 76 to the sample and hold circuit 68.

During record the once-around pulse 52 from the pick-up device 44 is applied through an amplifier 78 and the contact 80 of a record/playback switch 82 to a control magnetic recording head 84 which serves to record the pulse 52 on a track of the tape separate from the video tracks. In the playback mode the time of sampling of the sawtooth ramp 66 is established by a once-around signal **52*a* recorded on the tape. During playback the switches 76 and 82 are moved into playback position in contact with the contacts 86 and 88, respectively. Now the recorded once-around pulse 52*a* is picked up by the control head 84 and applied through the switch 82 to an amplifier 89 and to one input of an AND gate 90 through a variable delay network 92. The output from the AND gate 90 is applied to the sample and hold circuit 68 through the contact 86 of the switch 76. However, no output can occur from the AND gate until its second input is provided with a signal from a gate generator 94. The gate generator develops a gate pulse 96 only upon the simultaneous occurrence of a pulse 50 from the position pick-up device 40 and a once-around pulse 52 from the pick-up device 44. This assures that the heads are now playing back in the same sequence that the signals were recorded. The variable delay network 92 is provided so that the position of the delayed playback once-around pulse 52*a*** can be varied so as to accommodate differences in recording equipment.

The switching pulses 48 from the switching device 34 and the once-around pulses 52 from the pick-up device 44 are applied to an amplifier network 98 biased so that the composite output (curve 99) contains positive going pulses representing the once-around pulses 52 and negative going pulses representing the output pulses 48. This sequence of pulses when applied to a decoder 100 is used to switch the magnetic heads 16, 18 and 20 in the proper order.

SUMMARY OF OPERATION DURING RECORD

The control circuit for the motor 10 is set up to provide a motor speed approximating that which is desired for proper relative tape speed with respect to the magnetic heads. The precise speed and phase is established by a servo system having two servo loops, a velocity loop and a position loop. In the record mode the switches 76 and 82 are contacting the contacts 74 and 80, respectively. The head switching pick-up device 34 generates three head switching pulses 48 for each revolution of the disk. Each pulse 48 is applied to a ramp generator 54 and to a network 98. The application of each pulse 48 to the ramp generator causes the generation of a sawtooth ramp 56 which is applied to the sample and hold circuit 58. In addition, the position pick-up device 40 generates three position pulses 50 for each revolution of the disk, and these pulses are applied simultaneously to: (1) the sample and hold circuit 58 to derive a velocity error; (2) to the ramp generator 64 which serves to generate a position sawtooth ramp 66; and (3) to a control gate network 94 (the control gate network 94 serves no function during record mode).

At this point the output of the sample and hold circuit 58 determined by the interval between the pulses 48 and 50 causes the motor 12 to run at a predetermined speed. The position of the magnetic heads with respect to the video signal is established by applying the video sync pulse to the sample and hold circuit 68 through the switch 76. If there is any error, it means that the magnetic heads are not in the proper position with respect to the video sync, i.e., as shown in FIG. 1 the head 16 is not in the right position at the time of occurrence of the video sync pulse. The error which is developed in the sample and hold 68 is integrated in the position integrator 70 and the output from the position integrator 70 controls the speed of the motor so as to slow it down or speed it up until the heads are properly aligned with the video sync. In the meantime the once-around output pulses 52 from the pick-up devices 44 are recorded on the tape by means of the control head 84.

In addition, during the record mode the output pulses 48 and the once-around pulses 52 are applied to the network 98 and to the decoder and switching circuit 100. The decoder circuit is conventional and serves to establish the proper switching sequences for the recording heads 16, 18 and 20. With the arrangement shown, the logic circuitry of the decoder permits only the magnetic head 16 to record during the recording mode of operation.

SUMMARY OF OPERATION IN THE PLAYBACK MODE

In the playback mode the switches 74 and 80 are positioned in contact with the contacts 86 and 88, respectively. As in the record mode, the generation of switching pulses 48 causes the generation of the sawtooth ramp 56 which is sampled and held by the subsequent generation of the position pulses 50. The duration between the pulses 48 and 50 is a measure of the velocity and if the velocity is correct, no output error results. Also, as in the record mode, the output pulse 50 causes the generation of a sawtooth ramp 66. However, the ramp 66 is now sampled at a time determined by the recorded once-around pulse **52*a*. The time of application of the pulse 52*a* to the sample and hold circuit 68 is controlled in two ways: (1) it can be delayed in the delay network 92 to compensate for differences in equipment, and (2) it is supplied only in the presence of a control gate 96 from the output of gate generator network 94. A gate pulse 96 is produced only upon the occurrence of a position pulse 50 following the generation of a once-around pulse 52. This develops the coded pulses shown in the curve 99 and by means of the decoder 100 assures the proper sequence of operation of the heads 16, 18 and 20**.

POSSIBLE VARIATIONS

The disclosed embodiment schematically illustrates an arrangement of the invention which has been successfully reduced to practice. However, many possible variations to the arrangement, all falling within the scope of the invention, are contemplated. For example, magnetic pick-up devices may be substituted for the light-sensitive pick-up devices, thereby eliminating the holes and substituting magnetic materials. Furthermore, while the velocity servo takes a measurement of velocity error three times for each revolution of the disk 10, it is within the scope of the invention to operate with only a single measurement of velocity error if some slight performance degradation is acceptable, and provided the system includes some other means for switching the heads in a proper sequence.

In addition, while the disclosed embodiment establishes a velocity error by sampling the level of a sawtooth ramp at a given angular position and comparing the level of the ramp with a reference at ground potential, that comparison can be made with a reference at any voltage level. The basic factor is that an accurate measurement be made of the time of arcuate travel of a single point on a disk between two fixed stations and that the position of that single point at a certain station be synchronized with the transmitted video sync signal or a prerecorded control signal.

I claim:

1. In a video recorder-reproducer for recording and reproducing composite video signals, said signals including a vertical sync, said recorder-reproducer including rotatable mounting means for mounting a plurality of angularly spaced magnetic heads, drive means for driving said mounting means, a moving magnetic tape having its path of travel in the arcuate path of said magnetic heads and a servo system for controlling the rotation of said mounting means, said servo system comprising:

first means when each of said heads is in a predetermined angular position for generating a first signal;

second means when each of said heads is in a second predetermined angular position for generating a second signal;

means for measuring the time period between the generation of each of said first signals and the generation of each of the succeeding of said second signals;

means responsive to a deviation from a predetermined time period between the generation of each of said first signals and the generation of the succeeding of said second signals for generating successive velocity error signals;

means responsive to said velocity error signals for controlling the speed of said driving means to reduce said error;

switching means for successively operating said heads; and means responsive to the generation of each of said first signals for actuating said switching means.

2. The invention as defined in claim 1, and means for comparing the time period between the generation of each of said second signals and the occurrence of each succeeding vertical sync;

means responsive to a deviation from the predetermined time period between the generation of each of said signals and the occurrence of each succeeding vertical sync for generating successive angular position errors; and means responsive to said angular position errors for further controlling the speed of said driving means to reduce said error.

3. The invention as defined in claim 2, and means for recording a control signal on said magnetic tape, said means including a control head supplied with pulses generated in response to one predetermined angular position of said mounting means, said recorded control signal controlling said switching means for controlling the sequence of operation of said heads.

4. In a video recorder-reproducer for recording and reproducing composite video signals, said signals including a vertical sync, said recorder-reproducer including rotatable mounting means for a plurality N (where N is any number) of angularly spaced magnetic heads mounted thereon, drive means for driving said mounting means, a moving magnetic tape having its path of travel in the arcuate path of said magnetic heads, and servo system for controlling the rotation of said mounting means, said servo system comprising:

a plurality N of position indicating means on said mounting means, said position indicating means being equi-angularly spaced thereon;

a first position sensor fixedly mounted in the path of rotation of said position indicating means, said first position sensor generating a first pulse each time it is passed by one of said position indicating means on said mounting means;

a second position sensor spaced from said first position sensor in the arcuate path of travel of said position indicating means, said second position sensor generating a second pulse each time it is passed by one of said position indicating means on said mounting means;

means responsive to the generation of each of said first pulses for generating a first sawtooth voltage ramp;

additional means responsive to the generation of each of said first pulses for successively switching each of said magnetic heads into operation;

means responsive to the generation of each of said second pulses for generating a second sawtooth voltage ramp;

additional means responsive to the generation of each of said second pulses for successively sampling the voltage levels of said first sawtooth ramps;

means responsive to the deviation of the sampled level from a predetermined voltage level for controlling the speed of said motor;

means responsive to each occurrence of said vertical sync for successively sampling the voltage level of said second sawtooth ramps; and means responsive to the deviation of the levels of said second sawtooth voltage ramps from a predetermined level for controlling the angular position of said driving motor.

5. The invention as defined in claim 4, and an additional position indicating means on said mounting means;

a third position sensor mounted in the arcuate path of travel of said additional position indicating means, said third position sensor generating a third pulse each time said additional position indicating means passes said third position sensor; and means for recording said third pulse on said magnetic tape.

6. The invention as defined in claim 5, and means during playback for controlling the angular position of said mounting means in response to the playback of said control pulse.

7. The invention as defined in claim 6 wherein said position indicating means are light sources and wherein said position sensors are light sensitive pick-up devices.

8. In a video recorder-reproducer for recording and reproducing composite video signals, said signals including a vertical sync, said recorder-reproducer including rotatable mounting means for mounting a plurality of angularly spaced magnetic heads, drive means for driving said mounting means, a moving magnetic tape having its path of travel in the arcuate path of said magnetic heads and a servo system for controlling the rotation of said mounting means, said servo system comprising:

first means when each of said heads is in a predetermined angular position for generating a first signal;

second means when each of said heads is in a second predetermined angular position for generating a second signal;

means for measuring the time period between the generation of each of said first signals and the generation of each of the succeeding of said second signals;

means responsive to a deviation from a predetermined time period between the generation of each of said first signals and the generation of the succeeding of said second signals for generating successive velocity error signals; and means responsive to said velocity error signals for controlling the speed of said driving means to reduce said error.

9. The invention as defined in claim 8, and means for comparing the time period between the generation of each of said second signals and the occurrence of each succeeding vertical sync;

means responsive to a deviation from the predetermined time period between the generation of each of said signals and the occurrence of each succeeding vertical sync for generating successive angular position errors; and means responsive to said angular position errors for further controlling the speed of said driving means to reduce said error.

10. The invention as defined in claim 9, and means for recording a control signal on said magnetic tape, said means including a control head supplied with pulses generated in response to one predetermined angular position of said mounting means, and switching means for successively operating said heads, said recorded control signal controlling said switching means for controlling the sequence of operation of said heads.

* * * * *